June 4, 1929.  C. H. HAPGOOD  1,715,832
WEIGHING AND COUNTING SCALE
Filed June 3, 1921  2 Sheets-Sheet 2
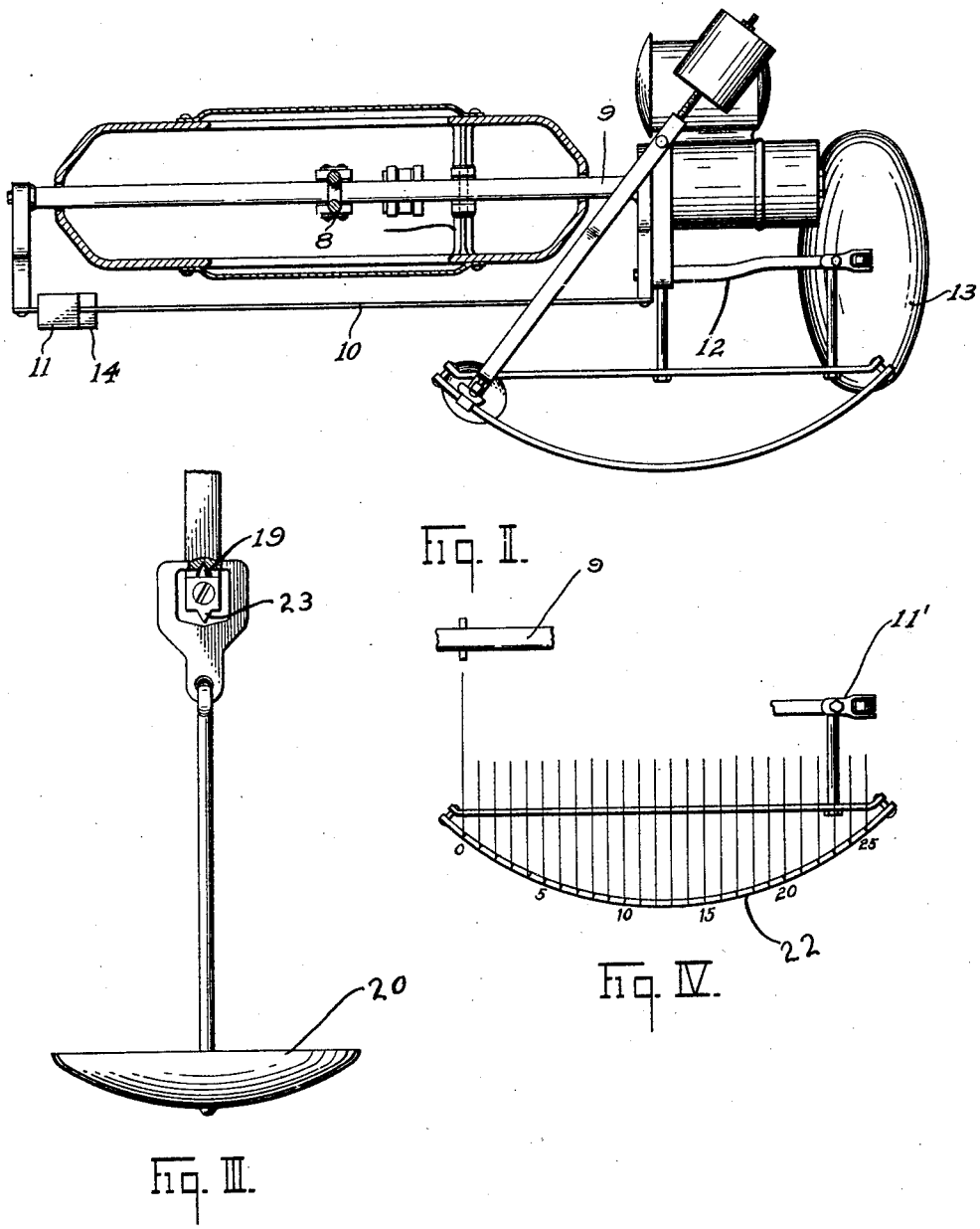
Inventor
CLARENCE H. HAPGOOD.
By C. C. Marshall
Attorney Patented June 4, 1929.

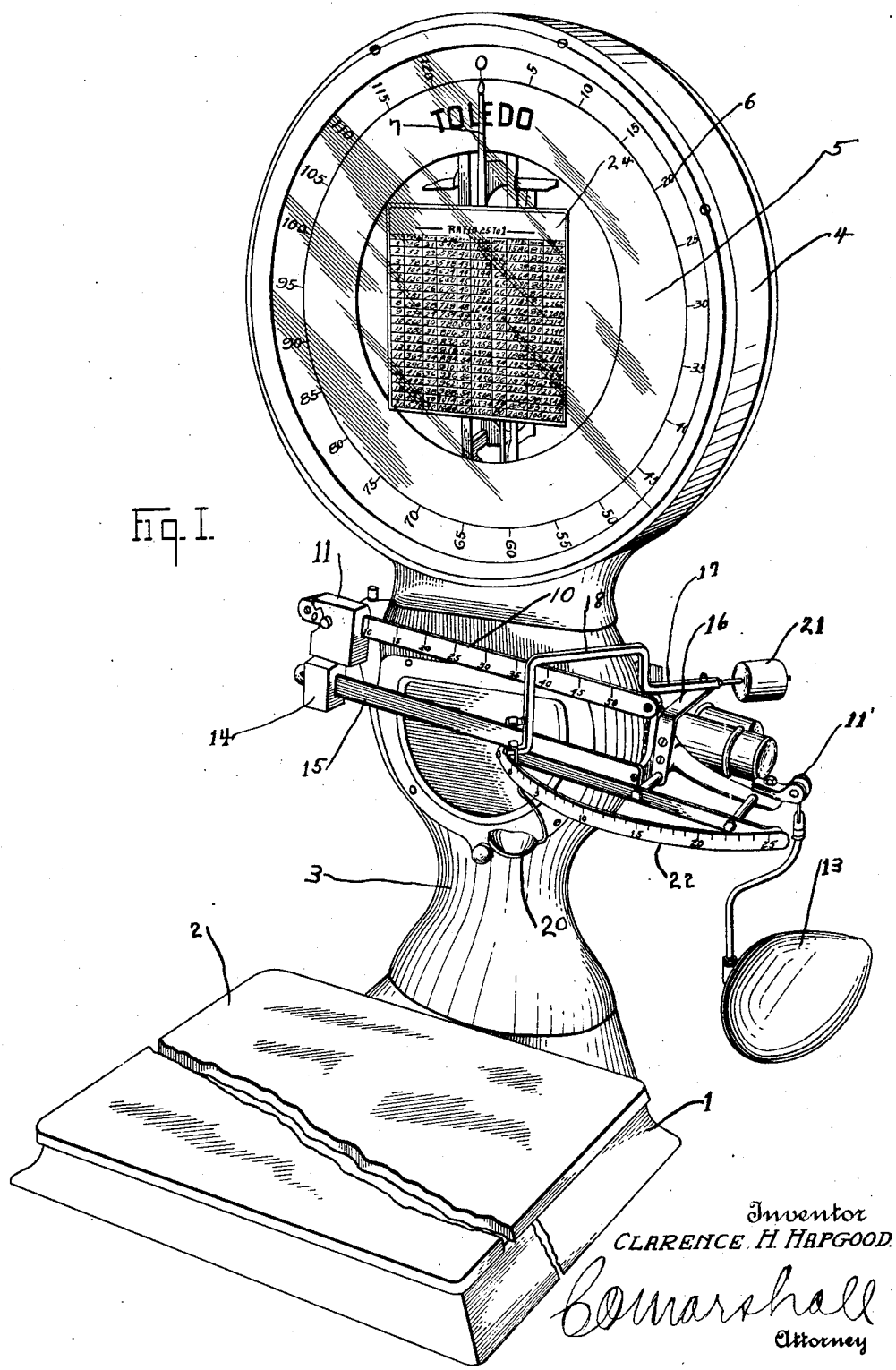

1,715,832

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING AND COUNTING SCALE.

Application filed June 3, 1921. Serial No. 474,813.

This invention relates to weighing and counting scales, and particularly to scales having a shiftable ratio pan adapted to support one or more specimens of the article to be counted in opposition to a quantity of such articles on the commodity-receiver of the scale.

One of the principal objects of the invention is to provide improved means for counteracting the weight of the ratio pan in all positions of adjustment.

Another object of the invention is to provide a ratio pan and a counterpoise therefor movable about a pivot on the tare beam lever, whereby the effect of the weight of the ratio pan and the support therefor is the same regardless of the position of adjustment of the pan.

Another object of the invention is the provision of means for supporting a ratio pan so that it may be moved along an arcuate beam extending from the fulcrum pivot of the tare beam lever of the scale to a point opposite a pivot supporting a fixed ratio pan.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a perspective view of a scale embodying my invention;

Figure 2 is a plan view of the tare beam lever of the scale and the parts attached thereto, the column supporting the tare beam being shown in section;

Figure 3 is an enlarged detail elevational view of the ratio pan showing the pivot by which it is supported; and Figure 4 is a diagrammatic plan view showing the method of marking the arcuate beam along which the ratio pan is moved.

Referring to the drawings in detail, I have shown my invention as applied to a weighing scale of substantially the type shown and described in my co-pending application Ser. No. 367,207, filed March 19, 1920, and, since the novelty in this case resides principally in the construction of the tare beam lever and the parts attached thereto and in the combination of the tare beam lever with weighing mechanism of the automatic type, the specific form of the weighing mechanism being immaterial, I have shown and will describe the other parts of the scale only in such detail as is necessary for clear understanding of the connection of the tare beam lever and attached parts therewith.

The base 1 of the scale supports and houses platform levers (not shown) of any preferred type upon which is supported a platform 2. Mounted at the rear end of the base is a column 3 which is surmounted by a substantially watch-casing-shaped housing 4 having a transparent face 5 through which is displayed a graduated dial 6 with an indicator hand 7 co-operating therewith. The indicator hand 7 is connected to suitable automatic load-offsetting mechanism (not shown) which is also contained in the housing 4.

Pivotally supported on knife edge pivots upon a bracket 8 secured within the upper portion of the column 3 is a tare beam lever 9 which is connected by means of tension links (not shown) to the platform lever mechanism and the automatic weighing mechanism of the scale. The tare beam lever 9 carries a tare beam 10 equipped with a poise 11 which may be moved outwardly on the beam to offset tare and also, upon occasion, to increase the capacity of the scale. It is to be understood that the scale may be used for ordinary weighing purposes and that the parts hereinafter described adapt the scale for the additional function of counting.

Supported upon a bracket 11' carried by an arm 12 extending from the end of the tare beam lever 9 is a ratio pan 13, the length of the arm 12 being such that an object placed in the ratio pan 13 will offset or counterbalance a definite number of similar objects placed upon the platform 2. The number of objects which may be so counterbalanced by a single object in the ratio pan 13 depends upon the multiplication of the platform levers of the scale, as well as the position of the fulcrum pivot of the tare beam lever 9 and the length of the arm 12. In practice the parts are variously so proportioned that an object in the ratio pan 13 will counterbalance 25, 50 or 100 objects of the same average weight on the scale platform.

When the scale is to be used for weighing purposes only it is sometimes convenient to remove the ratio pan 13 from the beam. The pan is therefore counterbalanced by a poise 14 which is mounted upon a beam 15 carried by the tare beam lever. When the pan is removed the poise 14 is slid to the other end of the beam 15, thus compensating for the change in the balance of the scale caused by the removal of the pan 13. Supported upon the tare beam lever in a position substantially midway between the fulcrum pivot and the pivot supporting the ratio pan 13 is a bracket 16 upon which is pivoted a bar 17 swinging in a substantially horizontal plane at right angles to the plane of movement of the tare beam lever. The bar 17 is bent upwardly at 18 in order that it may clear the tare beam 10. The forward end of the bar supports, by means of a cone pivot 19, a ratio pan 20, and the rearward end of the bar supports an adjustably mounted counterweight 21, the parts being so proportioned and arranged that the center of mass of the bar 17, ratio pan 20 and counterweight 21 is in the perpendicular axis of movement of the parts about the pivot on the bracket 16.

Supported upon the tare beam lever (see Figures 1 and 4) is an arcuate beam 22 extending from beyond a point substantially opposite the fulcrum pivot of the tare beam lever 9 to beyond a point substantially opposite the pivot upon which the ratio pan 13 is supported. The arcuate beam 22 is curved about the axis of movement of the bar 17 and is so positioned that the forward end of the bar 17 rides along its upper surface as the bar is swung about its pivot (see Figure 1).

In the scale illustrated the multiplication of the levers and the length of the arm 12 is such that a single specimen of an article to be counted will, if placed in the ratio pan 13, offset 25 similar articles placed upon the platform 2. It is obvious that an object supported by the shiftable ratio pan 20 at a point directly opposite the fulcrum pivot would have no effect in offsetting the weight of objects upon the platform and that if the bar 17 were moved so that the pivot 19 were at a point 1/25 of the distance from the axis of the tare beam lever fulcrum pivot to the axis of the pivot supporting the ratio pan 13 a single object in the ratio pan 20 would have 1/25 of the counterbalancing effect that the same object would have if placed in the ratio pan 13. If the bar 17 were moved so that the cone pivot 19 were 10/25 of the distance from the axis of the tare beam lever fulcrum to the pivot supporting the ratio pan 13 one specimen in the shiftable ratio pan 20 would offset 10/25 the number of articles that would be offset by the same specimen in the ratio pan 13, or ten articles. From the foregoing it is evident that the arcuate beam 22 may be marked with graduations numbered to represent the number of articles on the platform 2 that are counterbalanced by a single article in the shiftable ratio pan 20 when the bar 17 is moved to bring the cone pivot 19 directly opposite such graduation. In order to definitely indicate the position of the bar 17 it is provided with a pointer 23 adapted to selectively register with the graduations on the arcuate beam 22. The graduations are not equally spaced on the arcuate beam 22 but are equidistant from each other on a line parallel to the longitudinal axis of the tare beam lever (see Figure 4). The scale so constructed may be used either for determining the number of articles in a load dumped upon the platform 2 or for counting out a predetermined number of articles. In determining the number of articles in any given lot the entire lot is dumped upon the platform. The weight of the mass will cause the indicator hand to swing to a point in registration with the graduation representing the weight of the entire mass. A few of the articles on the platform are then counted into the non-shiftable ratio pan 13. As each article is dropped into the pan the indicator hand moves back toward zero position. When the hand has reached a point where the placing of another article in the pan 13 will cause it to swing past zero position, this article is placed in the pan 20 instead. The arm 17 is then swung along the arcuate beam 22 to a point at which the hand 7 registers with the zero graduation on the dial. We then have on the platform twenty-five articles for each specimen in the non-shiftable ratio pan 13 plus the number of articles indicated on the beam 22 by the pointer 23.

The scale may, if desired, be equipped with a chart 24 upon which are shown totals of the number of pieces on the platform and in the pan 13. When the scale is so equipped the only mental computation that need be made is that of adding the number indicated on the arcuate beam 22 to the total shown on the chart. When it is desired to count out a predetermined number of articles the required number of specimens is placed in the pan 13 and if the number to be counted out is not a number divisible by 25 a single specimen is placed in the shiftable ratio pan 20 and the bar 17 is moved to a position in which the necessary additional number is indicated on the beam 22 by the pointer 23. If, for example, it is desired to count out 163 pieces, 6 specimens are placed in the ratio pan 13, 1 specimen is placed in the pan 20, and the bar 17 is moved to a position in which the pointer 23 registers with the thirteenth graduation on the beam 22. The articles are then poured upon the platform until the indicator hand 7 registers with the zero graduation on the dial 6. When the hand 7 comes to zero position the number of articles on the platform 2 will be 163.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a counting scale, in combination, lever mechanism, a commodity-receiver supported thereby, said lever mechanism including a beam lever, a bar pivoted on said beam lever, and a ratio pan carried by said bar, the multiplication of said lever mechanism being such that the ratio of the leverage upon which said ratio pan acts to the leverage upon which said commodity-receiver acts ranges from zero to greater than 9:1, said bar being counterbalanced to bring the center of mass of said bar and the scale parts carried thereby substantially into the pivotal axis of the bar.

2. In a counting scale, in combination, lever mechanism, a commodity-receiver supported thereby, said lever mechanism including a beam lever, a bar pivoted thereto upon a substantially vertical axis, a ratio pan carried by one end of said bar, and a counterweight carried by the other end thereof, the multiplication of said lever mechanism being such that the ratio of the leverage of said ratio pan to the leverage of said commodity-receiver ranges from zero to greater than 9:1.

3. In a counting scale, in combination, lever mechanism, a commodity-receiver supported thereby, said lever mechanism including a beam lever, a bar pivoted thereto upon a substantially vertical axis, a ratio pan carried by one end of said bar, a counterweight carried by the other end thereof, an arcuate beam marked to indicate numerical counts on said beam lever, and a co-operating index on said bar.

4. In a counting scale, in combination, lever mechanism, a commodity-receiver supported thereby, said lever mechanism including a beam lever, a bar pivoted on said beam lever, a cone pivot on said bar, and a ratio pan carried by said pivot, the multiplication of said lever mechanism being such that the ratio of the leverage upon which said ratio pan acts to the leverage upon which said commodity-receiver acts ranges from zero to greater than 9:1, said bar being counterbalanced to bring the center of mass of said bar and the scale parts carried thereby substantially into the pivotal axis of the bar.

5. In a scale of the class described, in combination, a beam lever, a ratio pan non-shiftably supported on said beam lever at a distance from the fulcrum of the lever, a bar pivoted to said beam lever, and a second ratio pan carried by said bar, said bar being movable to shift said second ratio pan between the fulcrum of said beam lever and the point of support of the first said ratio pan.

6. In a scale of the class described, in combination, a beam lever, a ratio pan non-shiftably supported on said beam lever at a distance from the fulcrum of the lever, a bar pivoted to said beam lever between the fulcrum thereof and the point of support of said ratio pan, and a second ratio pan carried by said bar, said bar being movable to shift said second ratio pan between the fulcrum of said beam lever and the point of support of the first said ratio pan.

7. In a scale of the class described, in combination, lever mechanism, a commodity-receiver and ratio pan supported thereby, the leverage of the ratio pan being twenty-five times that of the commodity-receiver, said lever mechanism including a beam lever, a bar pivoted on said beam lever, and a ratio pan carried by said bar, the proportions of the parts being such that the leverage of the ratio pan carried by said bar varies from zero to twenty-five with respect to the leverage of the commodity-receiver.

8. In a counting scale, in combination, lever mechanism, a ratio pan and a commodity-receiver connected to said lever mechanism, an indicator hand connected to said lever mechanism, a dial co-operating with said indicator hand and having indicia about its outer edge, and a chart of smaller area than said dial located centrally thereon whereby said indicator and the indicia of said dial are visible about the sides of said chart, said chart bearing computations of totals of articles supported by said ratio pan and said commodity-receiver.

9. In a counting scale, in combination, lever mechanism, a commodity-receiver and ratio pan connected to said lever mechanism, automatic load-counterbalancing mechanism connected to said lever mechanism, an indicator hand connected to said automatic load-counterbalancing mechanism, a dial co-operating with said indicator hand and having indicia about its outer edge, and a chart of smaller area than said dial located centrally thereon whereby said indicator and the indicia of said dial are visible about the sides of said chart, said chart bearing computations of totals of articles supported by said ratio pan and said commodity-receiver.

CLARENCE H. HAPGOOD.